Figure 6:
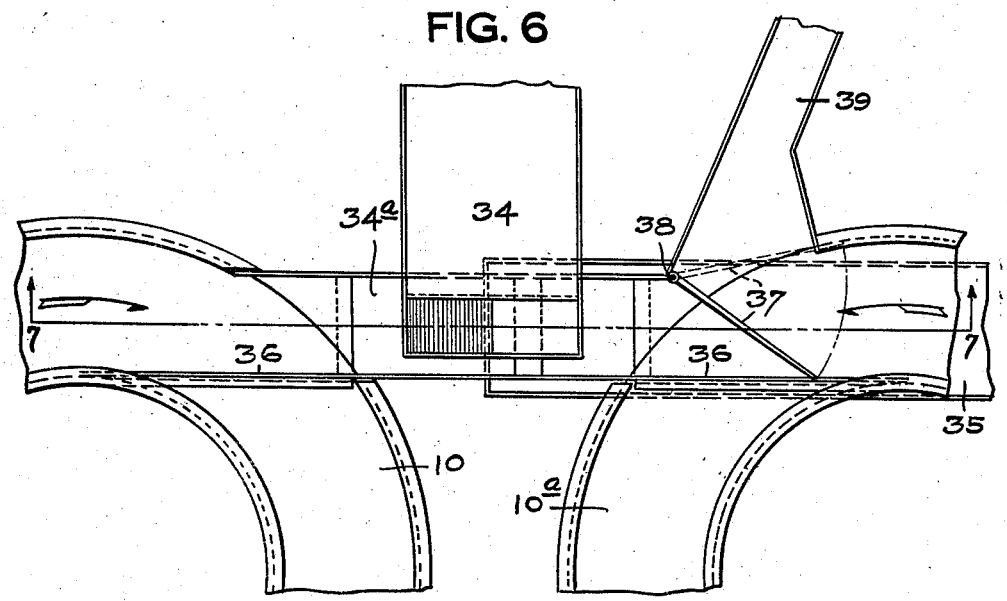

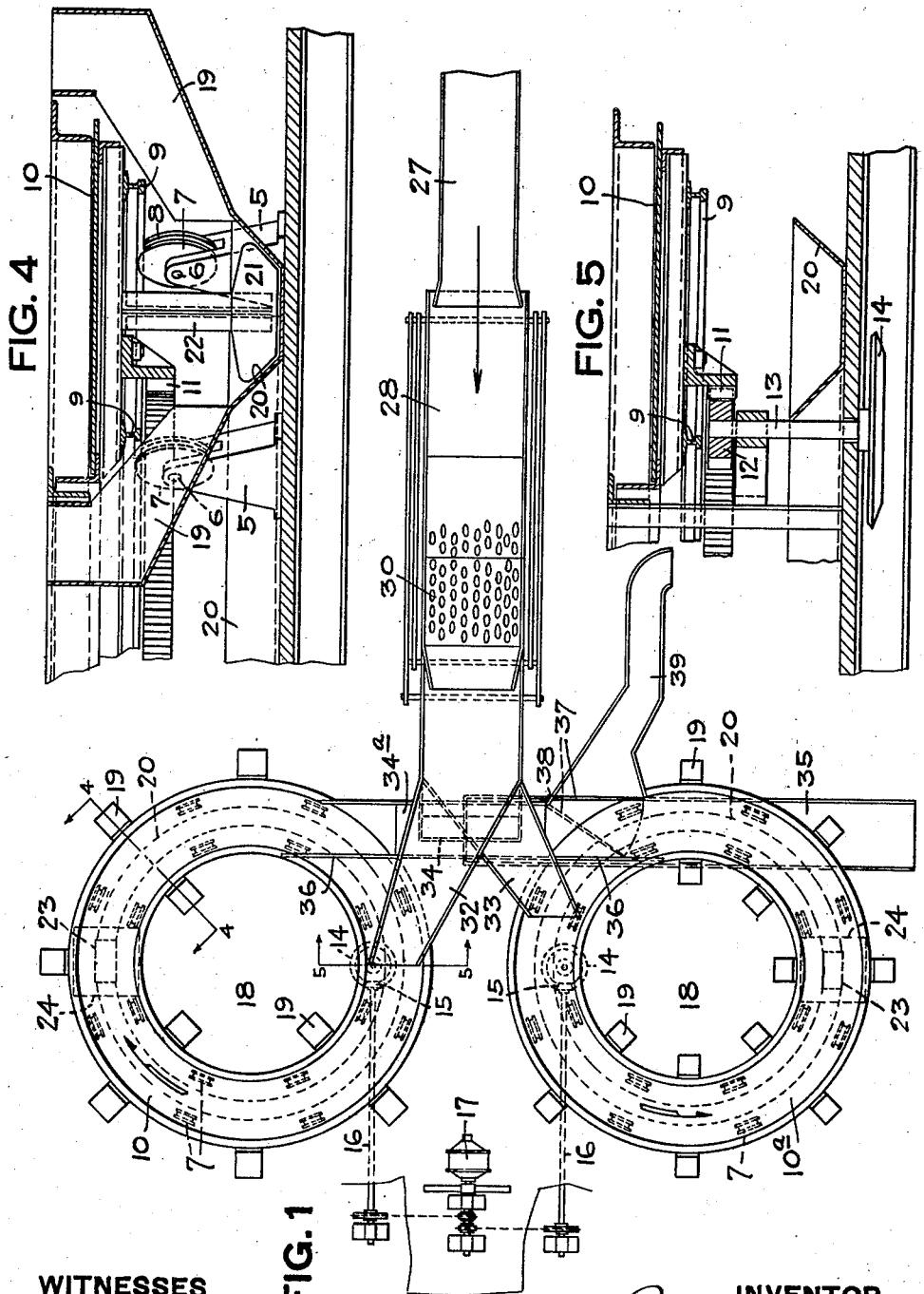

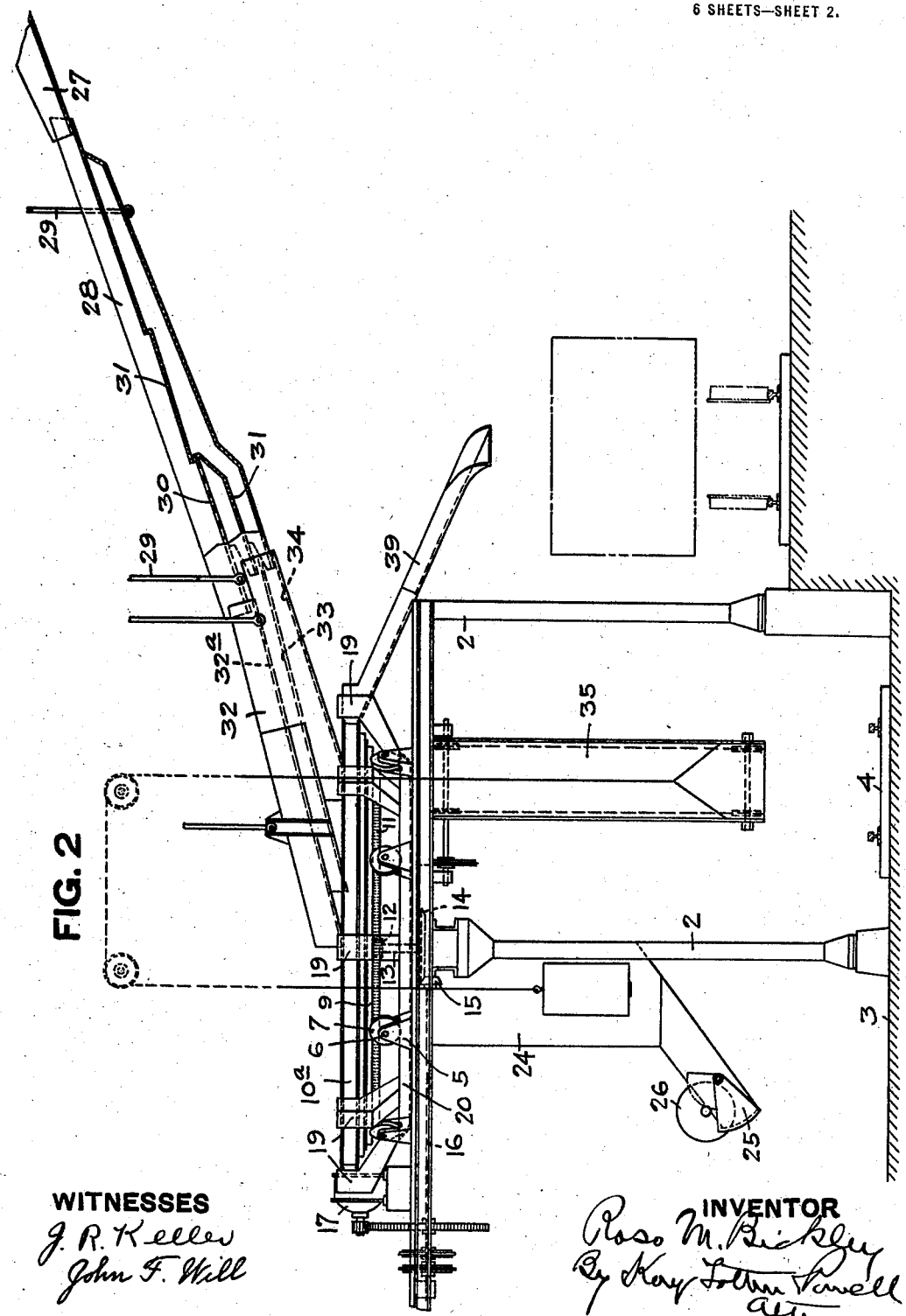

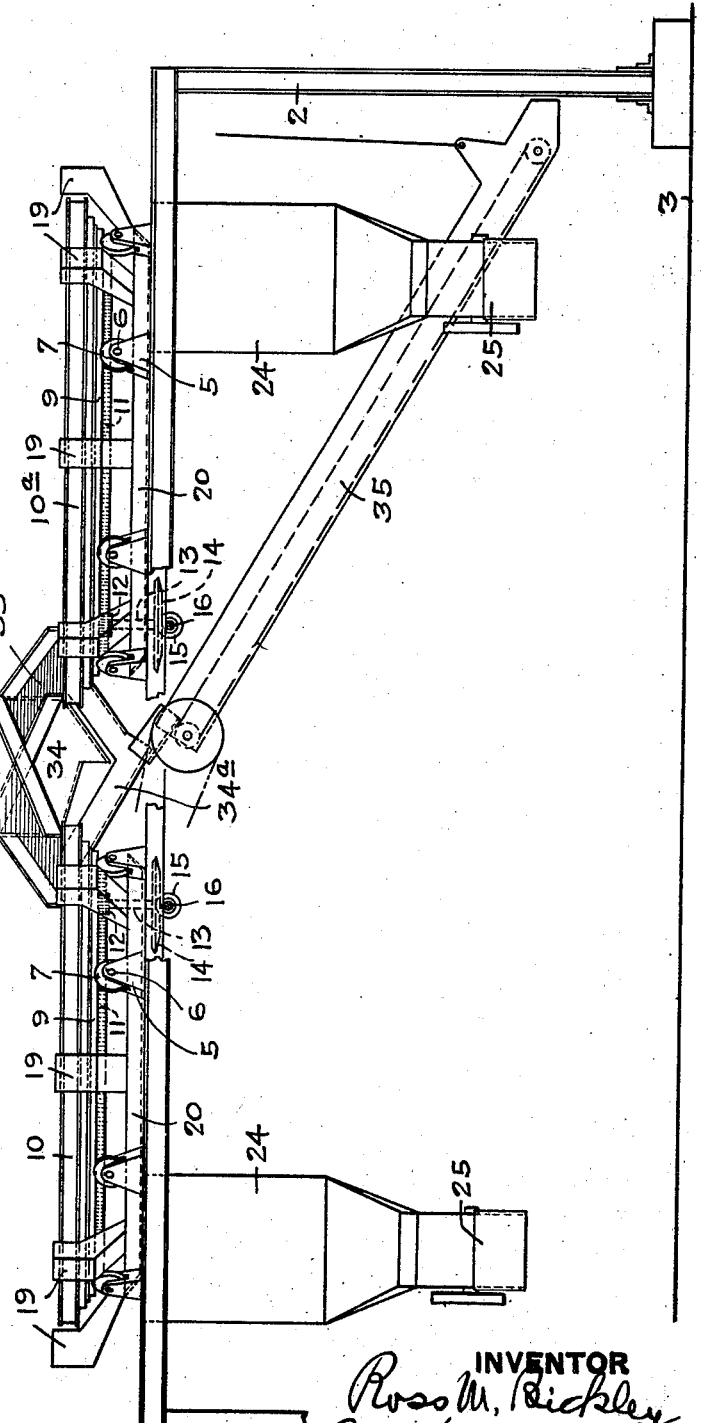

R. M. BICKLEY.
APPARATUS FOR HANDLING COAL.
APPLICATION FILED MAR. 13, 1915.

1,324,491.

Patented Dec. 9, 1919.
6 SHEETS—SHEET 4.

WITNESSES
J. R. Keller
John F. Hill

INVENTOR
Ross M. Bickley

R. M. BICKLEY.
APPARATUS FOR HANDLING COAL.
APPLICATION FILED MAR. 13, 1915.
1,324,491.
Patented Dec. 9, 1919.
6 SHEETS—SHEET 5.
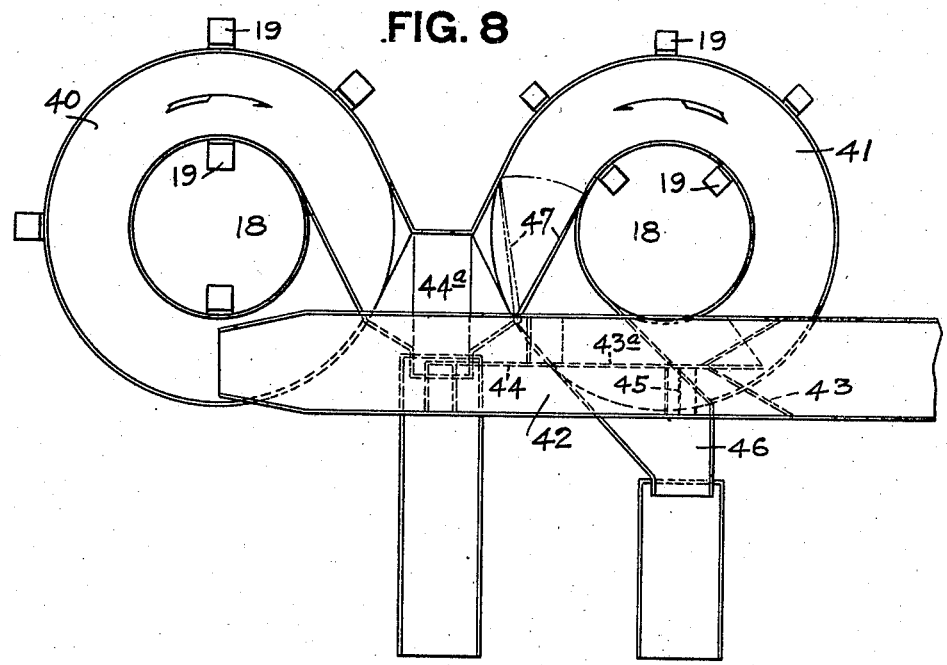
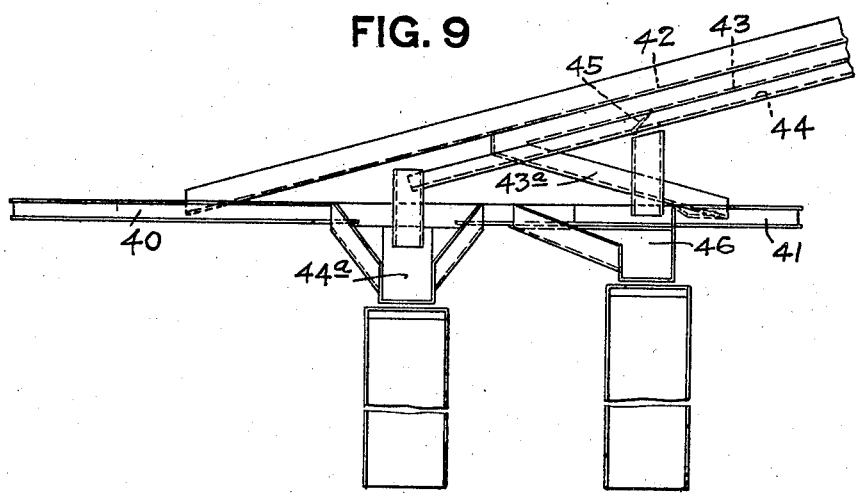
WITNESSES
J. R. Keller
John F. Will
INVENTOR
Ross M. Bickley
By Kay Totten Powell
attys

R. M. BICKLEY.
APPARATUS FOR HANDLING COAL.
APPLICATION FILED MAR. 13, 1915.

1,324,491.

Patented Dec. 9, 1919.
6 SHEETS—SHEET 6.

WITNESSES
J. R. Keller
John F. Hill

INVENTOR
Ross M. Bickley

UNITED STATES PATENT OFFICE.

ROSS M. BICKLEY, OF PITTSBURGH, PENNSYLVANIA, ASSIGNOR TO HEYL & PATTERSON, INC., OF PITTSBURGH, PENNSYLVANIA, A CORPORATION OF PENNSYLVANIA.

APPARATUS FOR HANDLING COAL.

1,324,491.  Specification of Letters Patent.  Patented Dec. 9, 1919.

Application filed March 13, 1915. Serial No. 14,155.

*To all whom it may concern:*

Be it known that I, ROSS M. BICKLEY, a citizen of the United States, and resident of Pittsburgh, in the county of Allegheny and State of Pennsylvania, have invented a new and useful Improvement in Apparatus for Handling Coal; and I do hereby declare the following to be a full, clear, and exact description thereof.

My invention relates to apparatus for handling coal.

In the mining of coal, run-of-mine coal, as it is termed, is a mixture of the different grades as mined, such as lump, egg and slack. As this run-of-mine coal contains refuse in the form of slate, rock, etc., it is necessary in some instances to resort to hand-picking to remove the refuse. The pickable refuse is always in the larger sizes of coal, and for the purpose of making its presence more apparent and thus facilitate their removal, it is a common practice to use shaking screens to separate coal into different sizes, such as lump, egg and slack. The lump and egg-coal are picked over to remove the refuse, and are loaded in the railroad cars separately or are mixed together and also with the slack, and loaded together. This product is known as "picked run-of-mine coal."

The facilities ordinarily provided for picking the lump and egg coal consist of conveyers usually four or five feet wide alongside of which are spaced suitable spouts or chutes for the pickers to throw the refuse into. These conveyers or picking tables also serve the purpose of conveying the picked coal to suitable loading chutes or loading conveyers. The loading conveyers or loading booms, as they are generally called, are arranged so that their discharge end may be raised or lowered to deposit the coal in a car with the minimum amount of drop and consequently, a minimum breakage of the lumps. In order to load the slack in the same car with the lump and egg, it is necessary to provide a conveyer to carry it forward to approximately the discharge point of the lump and egg picking tables, and since the conveyers and picking tables occupy considerable width, it is sometimes necessary to provide a cross-conveyer to carry the slack to the loading point of the lump and egg.

The refuse picked from the lump and egg is a waste product, which must be gathered to a central point and loaded into railroad cars, or other means provided for its disposal. The gathering of the refuse may sometimes be done by the return strand of the slack conveyer, but it is often necessary to provide a separate conveyer for that purpose.

For the purpose of providing a simpler and more efficient means of preparing coal for market, I have devised the invention forming the subject matter of this application, and my invention comprises the novel features hereinafter set forth and claimed.

Figure 7:
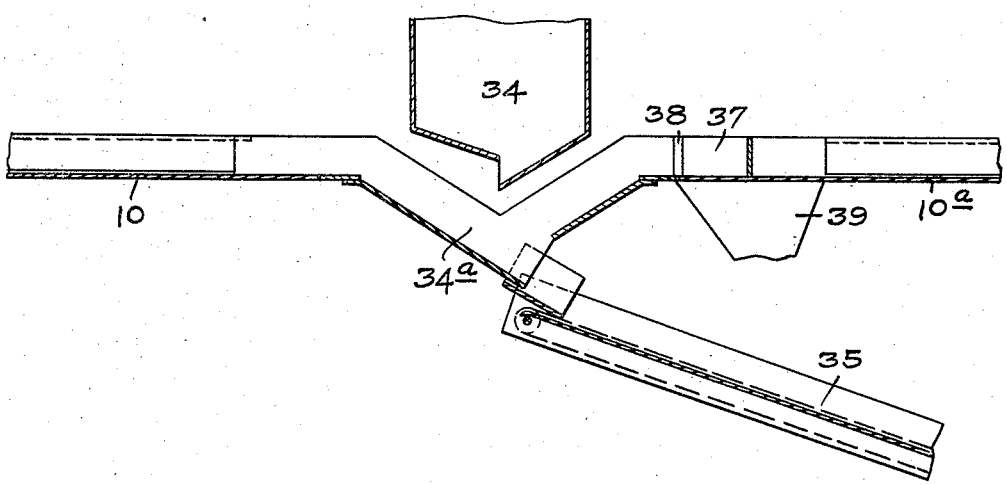
Figure 10:
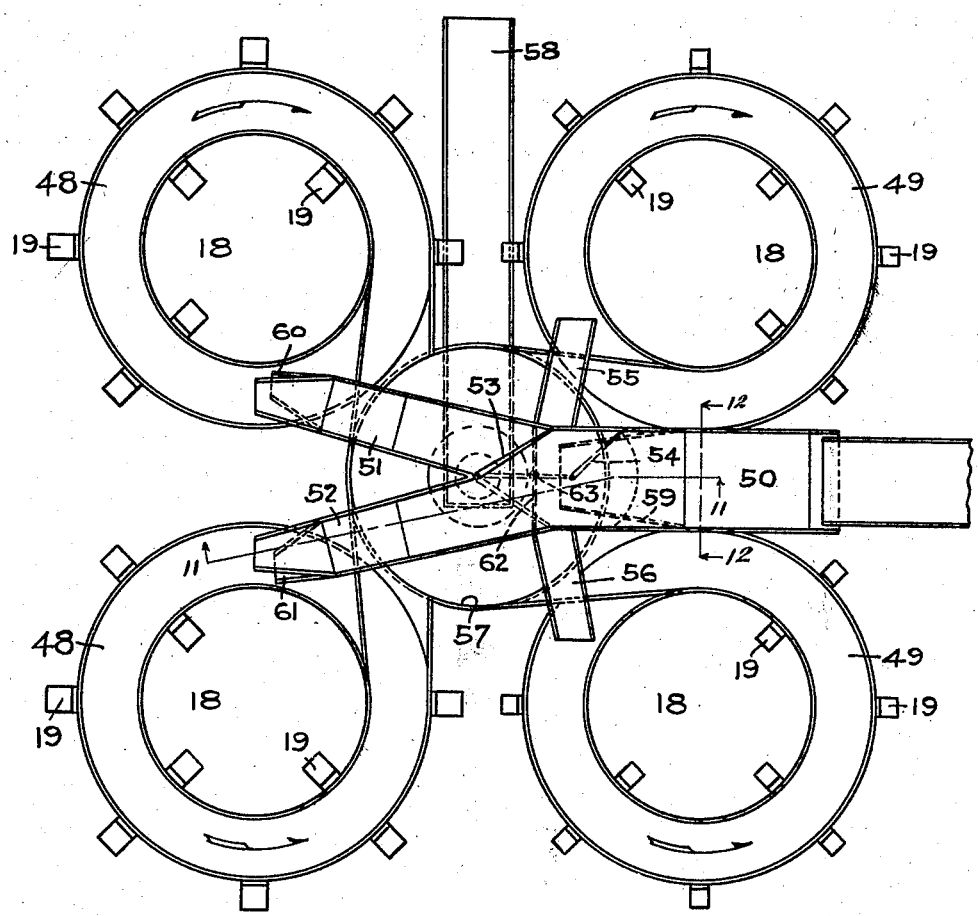

In the accompanying drawings, Figure 1 is a plan view of my improved apparatus; Fig. 2 is a side elevation; Fig. 3 is a view taken at right angles to Fig. 2 with portions cut away; Fig. 4 is a section on the line 4—4, Fig. 1; Fig. 5 is a section on the line 5—5, Fig. 1; Fig. 6 is an enlarged plan view of portion of Fig. 1, showing the picking tables and the manner in which the coal is directed therefrom on to the loading boom; Fig. 7 is a section on the line 7—7, Fig. 6; Figs. 8, 9, and 10 show modified forms of my invention; and Figs. 11 and 12 are sections showing the arrangement of chutes, taken on the lines 11—11 and 12—12, respectively, of Fig. 10.

In the drawings, the numeral 2 designates a suitable structure for supporting my improved apparatus, said structure being laid on a suitable foundation 3 with a track 4 laid thereon for the railway-cars.

Supported on the structure 2 are the stands or uprights 5 having shafts 6 journaled therein. The wheels 7 are carried by the shafts 6, and said wheels are flanged at their peripheries to form grooves 8, which receive the rails 9 on the bottoms of the picking-tables 10 and 10ª. The picking-tables 10 and 10ª are annular in form and troughlike, as clearly indicated in Figs. 1 and 4. The guard rail 10ᵇ forms one side of the trough of the picking table and the outwardly extending flange of said guard rail projects beyond the bottom plate of the trough, as clearly shown in Fig. 5. This guard rail is permanently secured in position and does not rotate with the trough, and said guard rail is not continuous but has the gap 10ᶜ, and this gap permits of the discharge of the material from the table. The tables are provided with the racks 11. Pinions 12 engage said racks, said pinions being mounted on the shafts 13 mounted in suitable bearings in the frame. Bevel-gears 14 on the shaft 13 are engaged by bevel-pinions 15 on the shafts 16, which are connected up to and driven by the motor 17. In this manner, rotary movement is imparted to the picking-tables 10 and 10ᵃ.

As stated above, the picking-tables are preferably annular in form leaving the space 18 on the inside in which the pickers may stand to pick the refuse from the coal contained on said tables. Chutes 19 are arranged at intervals in the space 18 into which the refuse is discharged by the pickers, and on the outside of the tables, like chutes 19 are provided into which the pickers located on the outer rim of the picking-tables discharge the refuse picked from the coal.

The chutes 19 discharge into the annular, stationary pan 20 below the picking-table. Flights 21 travel in the pan 20, said flights being connected by the arms 22 to the picking-tables, so that as said picking-tables are rotated, the flights move through the pan 20 and convey the refuse therein along said pan to the discharge opening 23, which leads into the chute 24. At the lower end of the chute 24 is the gate 25, operated by the hand-wheel 26. A car or other receptacle may be arranged at the bottom of the chute 24 for receiving the refuse.

The coal, as it comes from the mine, is discharged from the chute 27 into the ordinary shaking-screen 28, which is suspended by the rods 29. The shaking-screen 28 is made in two sections, the upper section having the screens 30 and 31. The coal as it passes down over the screens, is separated, the lump-coal passing down over the screen 30 into the upper deck 32ᵃ of the swinging-chute 32, while the egg-coal passes through the screen 30 and thence into the intermediate deck 33 of the chute 32, while the slack passes through the screen 31 to be discharged into the lower deck 34. The deck 32ᵃ discharges the lump-coal onto the picking-table 10, while the deck 33 discharges the egg-coal onto the table 10ᵃ. The slack passing down the lower deck 34 is discharged into the mixing chute 34ᵃ, where it meets the coal coming from the tables 10, 10ᵃ. The tables rotate in the direction of the arrows, Fig. 1, or in opposite directions, and as the coal is carried around in said tables, it is delivered therefrom by means of the plows or scrapers 36 and delivered into the mixing chute 34ᵃ. The plows or scrapers 36 extend through the gap 10ᶜ in the guard rail 10ᵇ, as clearly shown in Fig. 1. A loading-conveyer 35 is provided to receive the coal from the mixing chute 34ᵃ.

The plow 37 is mounted to swing as at 38 so that by swinging said plow over into the position indicated in full lines, Fig. 6, the coal may be directed into the chute 39 where it is desired to separate the egg-coal from the lump-coal instead of discharging both into the loading conveyer 35. The plow 37 swings through the gap 10ᶜ of the guard rail 10ᵇ.

In the operation of the apparatus, the run-of-mine coal is first screened in the manner illustrated, the lump-coal being discharged onto the picking table 10, the egg-coal onto the picking-table 10ᵃ, and the slack passing directly into the mixing-chute 34ᵃ. As the tables rotate, the pickers remove the slate and other refuse from the coal, which they discharge into the chutes 19. The picked coal then passes around to the point where it is discharged by the plow 36 into the mixing-chute 34ᵃ where it is mixed with the slack. The lump, egg and slack is thoroughly mixed in the mixing-chute and the slack acts to protect the lump against breakage as it passes down into the loading conveyer for it breaks the fall as it were giving a minimum amount of breakage with a thorough mixing. An important reason for mixing in this manner is to get maximum weight into a given volume.

The refuse discharged into the chutes 19 passes into the pan 20, and is moved along said pan by the flights 21 until the opening 23 is reached, when said refuse is discharged into the hopper 24 to be disposed of as desired.

In Figs. 8 and 9, I have illustrated a modified form of my invention in which the picking-tables 40 and 41 are arranged on one side of the screens, the lump-coal passing down the deck 42 onto the table 40, and the egg-coal passing down the deck 43 where its direction of travel is reversed by the chute 43ᵃ, which discharges it onto the table 41. The slack passes down the lower deck 44 to be delivered into the mixing-chute 44ᵃ. The lower-deck 44 has the gate 45 by means of which the slack may be directed into the mixing chute 46 to be mixed with the egg-coal instead of lump-coal.

The table 41 has the swinging plow or baffle 47 for deflecting the egg-coal either into the chute 44ᵃ or into the chute 46. In this manner, provision is made for mixing the coal in several different ways.

In Fig. 10, I have illustrated another form of my invention in which there are four picking tables, the two designated by the numeral 48 being for lump-coal, and the two designated by the numeral 49, for the egg-coal. The lump-coal comes down chute 50, which is divided into two chutes 51 and 52 so that the coal by means of the swinging plow 53 may be directed into either chute and so onto either of the tables 48 or to both tables at the same time. The chutes 51 and 52 direct the coal to the outer portions of the tables. The egg-coal is diverted by the swinging plow 54 to either chute 55 or 56, according to whether one or both of the tables 49 are to receive the coal. The coal after being picked, is delivered to a mixing hopper 57, which delivers to the loading conveyer 58. There is the chute 59 for discharging the slack into hopper 57.

The extensions 60 and 61 may be used where it is desired to direct the egg-coal to the inner portions of the tables. A gate 62 is pivoted at 63 and by swinging said gate on its pivot the coal may be directed in said extensions.

By my invention, I provide a simple and compact form of apparatus by means of which the run-of-mine coal is first separated and picked, and then mixed again or segregated as desired, according to the use to which the coal is to be put. The refuse is carried off and disposed of at the same time, and a plant provided with such apparatus is capable of handling coal in large quantities and with a minimum amount of cost.

What I claim is:

1. In apparatus for handling coal of the character described, the combination of a picking-table, means for delivering the coal thereto, chutes for the refuse, a pan below said table into which said refuse is discharged, and means carried by said picking-table for moving said refuse through said pan to an outlet therein.

2. In apparatus for handling coal of the character described, the combination of a picking-table, means for delivering the coal thereto, chutes for the refuse, a pan below said table into which said chutes discharge, flights carried by said table and extending into said pan to deliver the refuse into an opening in said pan.

3. In apparatus for handling coal of the character described, the combination of a rotary annular picking-table, means for discharging the coal onto said table, chutes for refuse in the space inclosed by said annular table, a pan below said table into which said chutes discharge, and means for moving said refuse through said pan to an opening therein.

4. In apparatus for handling coal of the character described, the combination of a screening device, a plurality of picking-tables, means for discharging one grade of coal onto one table, another grade of coal to another table, means for discharging the slack, a mixing-chute, and means for directing the coal from said tables and the finest coal into said chute simultaneously.

5. In apparatus for handling coal of the character described, the combination of a screening device, a rotary picking-table, means for discharging a portion of the coarser coal onto said table, means for discharging the coal therefrom, means for discharging the finer coal at a point adjacent to the discharge point of said table, and a mixing chute at said last-named point to receive the coal.

6. In an apparatus for handling coal of the character described, the combination of a rotary annular picking-table, a plurality of chutes, a fixed plow for the discharge of the material to one chute, and a movable plow for discharging the material to another chute.

7. In an apparatus for handling coal of the character described, the combination of a rotary annular picking table, means for discharging the coal onto said table, a stationary guard rail forming the outer side of said picking table having a cut-away portion forming a gap, a chute, and a swinging plow adapted to swing across said table moving through said gap.

In testimony whereof, I the said Ross M. Bickley, have hereunto set my hand.

ROSS M. BICKLEY.

Witnesses:
ROBT. D. TOTTEN,
JOHN F. WILL.